March 20, 1962   T. B. HOWELL ET AL   3,025,756
PROJECTION DEVICE FOR PRODUCING COMPOSITE
OPTICAL IMAGE EFFECTS
Filed Sept. 24, 1957   3 Sheets-Sheet 1

INVENTORS
THOMAS B. HOWELL
MILTON ROGIN
BY
Andrew Kafko
ATTORNEY

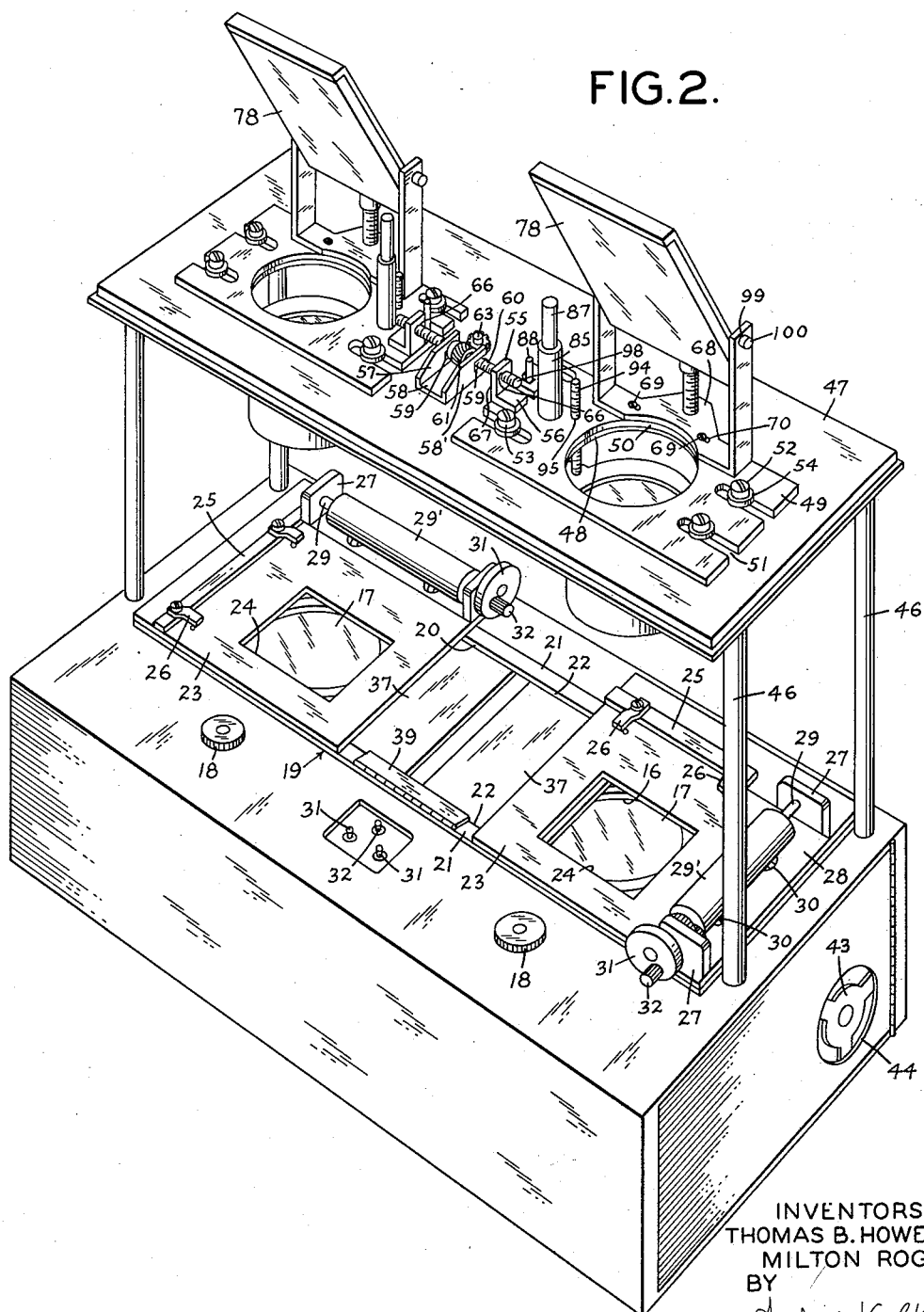

INVENTORS
THOMAS B. HOWELL
MILTON ROGIN
BY
ATTORNEY

United States Patent Office 3,025,756
Patented Mar. 20, 1962

3,025,756
PROJECTION DEVICE FOR PRODUCING COMPOSITE OPTICAL IMAGE EFFECTS
Thomas B. Howell, 1815 Palmer Avenue, Larchmont, N.Y., and Milton Rogin, 924 Woodmere Drive, Woodmere, N.Y.
Filed Sept. 24, 1957, Ser. No. 685,905
1 Claim. (Cl. 88—24)

This invention relates generally to image projection devices, and more particularly to improvements in image projection devices for producing superimposed, composite, or selectively separate, optical images with the use of two separate image producing systems.

Projection devices for producing superimposed, composite, or selectively separate, optical images with use of two separate image producing systems have found wide applicability in the image projection art for programming of many types. Thus, such projection devices are used to particular advantage in illustrated lectures, demonstrations, talks and the like, where the composite, superimposed, or selectively separate images may be projected on a screen for direct viewing by an audience with the resulting images altered and/or manipulated with dramatic effect. Such projection devices are also used to advantage in the production of novel visual effects for inclusion or incorporation in motion picture films by direct projection of the superimposed, composite, or selectively separate images (altered and/or manipulated) into the lens of a motion picture camera or, alternatively, by photographing the images produced by the projection devices on a screen, by a motion picture camera. Similarly, the various optical effects may be directed into the lens of a television camera or, again alternatively, on a screen which may be scanned by the television camera.

In programming as referred to above, whether it involves direct viewing, photographing with a motion picture camera, or pick-up by a television camera, and whether it concerns illustrating news, sports, weather, or commercials, or titling programs, giving credits, or achieving novel visual effects in films or television broadcasts; it may be desired to project a single composite image; to have a horizontal wipe of one image as another is made to appear; to have a lap dissolve in which one image is gradually dissolved as another is made to appear, to have an iris dissolve of one image as the other gradually appears; to have an instantaneous cut from one image to another; to have a moving title appear on a screen, and the like.

The desirability of the foregoing effects for direct viewing, motion picture filming and television broadcasting being recognized, the art has constantly sought devices for achieving such effects with greater technical perfection, with greater operational ease, with the use of less complicated structures, and with the involvement of decreased initial and maintenance cost of such devices. A composite optical image projection apparatus representing noteworthy advances in the achievement of the foregoing objects, is illustrated, described and claimed in U.S. Patent No. 2,754,722 of T. B. Howell and Milton Rogin, the present inventors. The composite optical image projection apparatus described in the aforesaid patent, because of its achievements in the categories enumerated, has met with wide acceptance and commercial success in the art.

The present invention is for an improved device for projecting superimposed, composite or selectively separate, optical images, which has, as a prime object, the provision of a neat, compact, sturdy and relatively low cost projection device having fewer relatively simple parts which may readily be assembled and which are not likely to become out of order.

Another primary object of the present invention is to provide a device which may readily be operated even by untrained personnel after but a short period of instruction to produce the desired novel visual effects referred to hereinbefore.

It is yet another object of the present invention to provide a novel projection device with fewer optical components; namely, mirrors, with concomitant reduction in overall dimensions of the devices to thus make for compactness, reduction of cost of the device by the elimination of certain of such mirror components and the otherwise necessary mounting and adjustment means for such components; as well as the elimination of the attendant problems of adjustment inherent in the prior provision of such additional mirrors.

It is a salient object of the present invention to provide an optical projection device capable of producing composite images that may be partially or completely superimposed or shown separately in completely controlled manner and in substantially perfect optical alignment as desired.

It is yet another object of the present invention to provide as part of the optical system of the projection device, a large barrel lens and inclined mirror system to achieve the foregoing objects.

It is yet another object of the invention to provide a projection device that has an integrally movable lens and mirror system that curtails the necessity for adjustment therebetween during operation.

Another object of the present invention is to provide unitary adjustment means for the integrally movable lens and mirror system that facilitates the adjustment of said system when controlling the alignment of the separate images projected by the projection device of the invention.

Yet another object of the present invention is to provide unitary adjustment means for simultaneous adjustment of a pair of integrally movable lens and mirror units towards and away from each other by manipulation of a single adjustment control provided in the projection device.

It is yet another object of the invention to provide separate adjustment means for each large barrel lens and inclined mirror of the optical system to permit focusing control and/or vertical alignment control of the images projected by the projection device.

With the foregoing objects in view in conjunction with other objects that will appear from reading of the following description of the invention, our invention resides in the novel arrangement and combination of parts and in the details of construction hereinafter described and claimed; it being understood that changes in the precise embodiments of the invention herein described may be made within the scope of what is claimed without departing from the spirit of our invention. It will be further understood that our invention is susceptible of embodiment in many and various forms, one of which is illustrated in the accompanying drawings, and that the structural details and mode of assembly herein set forth may be varied to suit particular purposes and still remain within our inventive concept.

The invention will be more clearly understood from a consideration of the following description taken in connection with the accompanying drawings that form a part of this specification. In such drawing, wherein like numerals identify like parts in the several views thereof:

FIG. 2 is another and enlarged perspective view of the apparatus shown in FIG. 1 with the shadow box of the latter removed, to show the details of the optical system mountings, and the operating mechanisms therefor;

Figure 1:
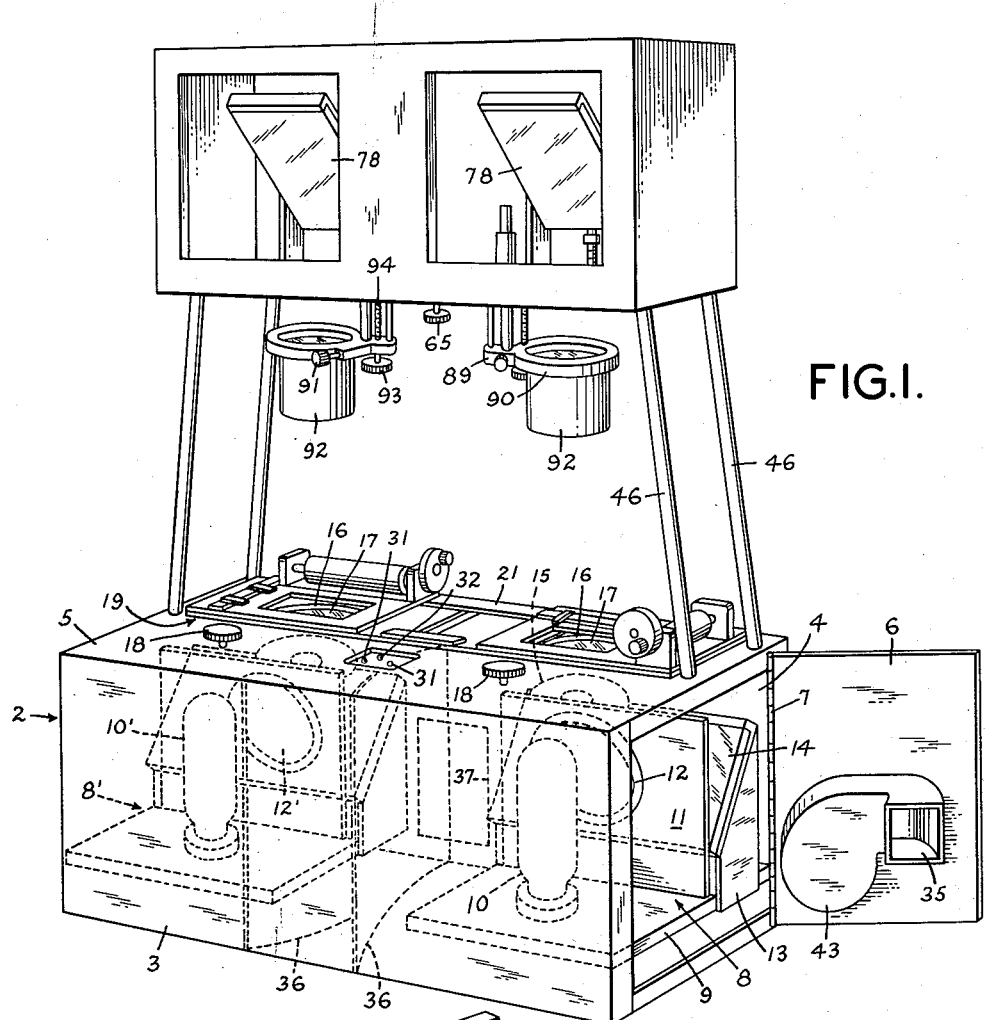
FIG. 1 is a perspective view of an apparatus embodying the present invention.
Figure 3:
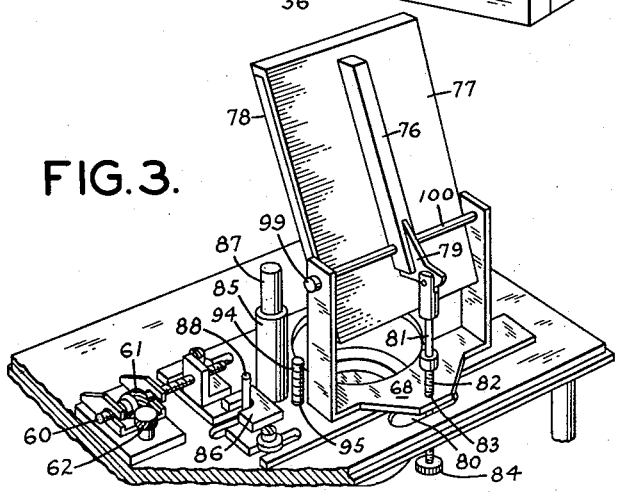
FIG. 3 is an enlarged rear view of a part of the apparatus to show in greater detail the support and operating mechanism for one of the mirrors shown in FIGS. 1 and 2.
Figure 4:
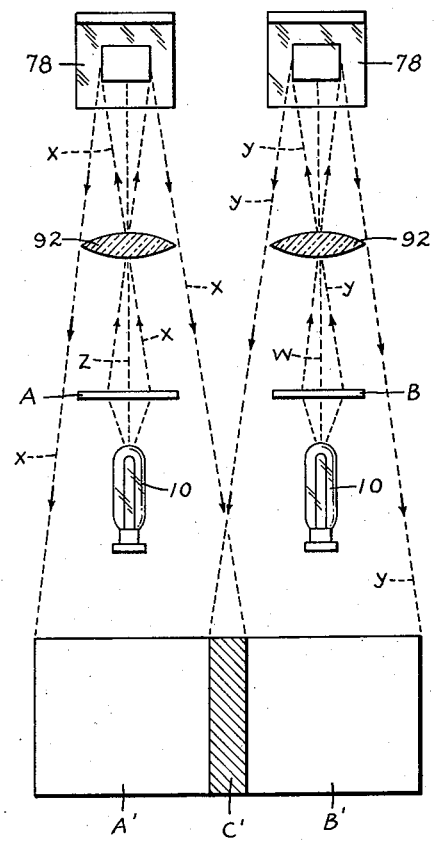
FIG. 4 is a diagrammatical representation of the optical system of the apparatus shown in FIGS. 1–3, illustrating the path of light from two separate images and the misaligned composite image formed prior to adjustment of the lens and mirror systems.
Figure 5:
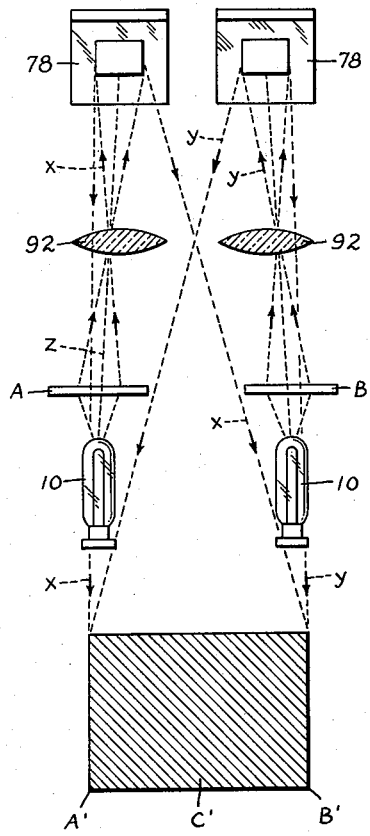
Figure 6:
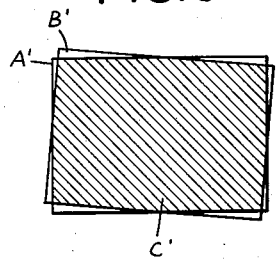

FIG. 5 is a diagrammatic representation of the optical system of the apparatus in FIGS. 1–3, similar to FIG. 4, but illustrating how alignment of the two images into a composite image may be achieved by adjustment of the lens and mirror units; and FIG. 6 is a diagrammatical representation of the rotative misalignment of images that may not be avoided entirely by the prior art composite projection devices of which we are so far aware, even when substantial vertical and horizontal alignment is achieved.

Referring now to FIG. 1, the device comprises a hollow base 2 in turn comprising a front wall 3, a rear wall 4, a top wall 5 and end walls 6 hinged at 7 to form end doors. Housed within the hollow base 2 are two separate light beam projection systems 8. As viewed in FIG. 1, only part of light beam projection system 8 on the right is directly visible through the open end of hollow base 2 exposed by end door 6 being in an open position, with the remainder of said light beam projection system 8 and all of its counterpart light beam projection system 8 to the left being shown in phantom by broken lines.

Each light beam projection system 8 comprises, respectively, a platform 9, a lamp 10 mounted thereon, an upstanding mounting 11 positioned rearwardly of lamp 10, a lens 12 supported in vertical position by mounting 11 in the path of the light from lamp 10, a second upstanding mounting 13 rearwardly of mounting 11, a reflecting mirror 14 supported by mounting 13 in the path of light passing through lens 12 and inclined to reflect the light from lens 12 upwardly through an adjustable iris shutter 15 mounted below top wall 5. Adjustable iris shutter 15 may be of conventional design, and also conventionally, a reflector (not shown) may be positioned forwardly of each lamp 10 for reflecting the light thereof rearwardly towards the lens 12 associated therewith.

Each end door 6 has mounted on the inside surface thereof, a blower 43. Each blower 43 (only one of which is visible in FIG. 1) has an outlet opening 44 positioned so that when the door 6 on which it is mounted is in closed position, said outlet opening 44 is then located adjacent the associated one of lamps 10. Each blower 43 has an inlet opening 35 (FIG. 2) in the outside surface of its associated end door 6. A curved baffle plate 36 is positioned beyond each of lamps 10, respectively (as shown in phantom in FIG. 1), to direct the current of air blown therepast by associated blower 43 through a common aperture 37 in rear wall 4 (as likewise shown in phantom in FIG. 1).

An aperture 16 in top wall 5 is provided over each iris shutter 15. Mounted in each aperture 16 is a conventional condensing lens system 17 through which light from a respective lamp 10 passes in amount controlled by means of adjustable iris shutter 15. A separate knob 18 is provided on top wall 5 for adjusting the aperture opening of each of iris shutters 15, respectively, in known manner. A separate switch 31 is provided on top wall 5 for controlling the energization of each lamp 10, respectively, while a single switch 32 is provided for controlling the energization of both blowers 13 simultaneously.

A rectangularly shaped frame 19 having its longer dimension almost the width of top wall 5 and having a similarly shaped large aperture 20, is fixedly supported on top wall 5. Aperture 20 has its shorter dimension large enough and extends sufficiently towards either end of frame 19, to expose substantially both lenses 17. The longer reaches 21 of frame 19 are preferably provided as U-shaped channel members, the grooves 22 of which are opposed to each other for a purpose that will appear presently.

Mounted on either end of frame 19, in spaced apart relationship, are a pair of much smaller rectangularly shaped frames 23, each of which also has a rectangularly shaped aperture 24 that, in this case, however, substantially overlies and exposes only a respective one of the lenses 17. Right-hand frame 23, as viewed in FIGS. 1 and 2, has affixed thereto on its remote reach 24 that extends in the direction of longer reach 21 of large frame 19, an aligning bar 25 extending in said same direction. Aligning bar 25, in turn, has affixed thereto a pair of resilient retaining clips 26, that overlie and resiliently abut remote reach 24 of frame 23.

A pair of uprights 27 are also affixed to said frame 23 in spaced apart relationship on the right-hand reach 28 thereof that extends in a direction at right angles to the longer reaches 21 of large frame 19. Uprights 27 function as end bearing members for a spindle 29 rotatably mounted thereon. Mounted on spindle 29 for rotation therewith is a cylinder 29′ of substantially larger diameter and respectively of a resilient material such as rubber. A pair of rollers 30 are mounted in frame 23 to protrude partially therefrom and abut the surface of cylinder 29′. A wheel 31 with a handle 32 thereon is rotatably mounted on one of the uprights 27 and is connected through a reduction gear train (not visible) with spindle 29 for rotating large cylinder 29′.

Left-hand frame 23 (as viewed in FIGS. 1 and 2) is preferably provided as shown with a similar aligning bar 25, clips 26 thereon, a roller drive assembly 27—32 as in the case of frame 23 already described, except that in the present case, the bar 25 and clips 26 extend in a direction at right angles to that of the same structure on right-hand frame 23, and are positioned remote from the roller drive assembly 27—32 thereof, while the roller drive assembly of left-hand frame 23 is in the position occupied by bar 25 and clips 26 on right-hand frame 23.

A pair of plate members 37 are slidably supported in grooves 22 of frame 19. Plate members 37 are dimensioned so that, in the inward position shown in FIGS. 1 and 2, their edges remote from each other do not extend within the apertures 24 of frames 23, respectively, and thus do not obturate the lenses 17 in top wall 5. The plates 37 are each provided with a knob (not shown) whereby a respective plate 37 may be slid in grooves 22 to overlie and thus obturate a respective lens 17 as described. Hinged plate 39, in the position shown, may cover said knobs to obviate any accidental movement thereof. As will be readily understood, forward flipping of hinged member 39 uncovers the knobs which may then be manipulated for sliding plates 37 as desired.

Mounted at each end of hollow casing 2 on top wall 5 thereof, are a separate pair of supporting leg members 46 that support a rectangular platform 47 above frame 19. Platform 47 has two enlarged apertures 48 therethrough in general vertical alignment with a respective frame 23 and condensing lens 17 system of each of the light beam projection systems 8. Supported over each of the enlarged apertures 48, respectively, is a plate member 49 of general rectangular configuration that extends over the large apertures 48. However, each plate member 49 is provided with a smaller circular aperture 50 in general axial alignment with a respective enlarged aperture 48, and a plurality of opposed slots 51. The slots 51 extend toward the central aperture 50 and receive the shanks of screws 52 and 53 that are affixed to frame 47 and are provided with retaining washers 54. As will be apparent, the screws 52, 53, washer 54 and slot 51 arrangement permits a limited amount of lateral movement of plate 49 in the direction of the slots to the extent of abutment of screws 52 in direction to the right as viewed in FIG. 2 and screws 53 in the other direction. Each plate 49 is provided at its proximate edge with an L-shaped bracket 55 that is fastened at its lower horizontal reach 56 to the plate 49.

Fastened to the rectangular platform 47 and substantially centrally located between the plates 49 is a bracket 57 of generally U-shaped cross section that has its base portion 58 fixedly mounted on the platform 47 and is provided in each of its upstanding arms 58' with apertures 59 that function as bearings for a rod 60. Rod 60 has fixedly mounted thereon for rotation therewith a helical gear 61 in mesh with a second cooperating helical gear 62 located on a shaft 63 that extends vertically downwardly through platform 47, and is mounted for rotative movement by means of a knurled operating knob 65 located beneath platform 47.

Rod 60 is of sufficient length to extend through apertures 66 provided for such purpose in each of the upper reaches 67 of L-shaped brackets 55. The opposite ends of rod 60 are provided with oppositely disposed threads 98 that cooperate with internal threads in the apertures 66 of brackets 55 so that rotation of rod 60 in one direction causes L-shaped brackets 55 and the attached plates 49 to move toward each other in a fixed path determined by the slot 51 and screw 52, 53 system described hereinbefore, while rotation of the rod in the opposite direction will cause the L-shaped brackets 55 and their respective plates 49 to move away from each other as will be well understood.

Also mounted on each of plates 49 for movement therewith are large, generally U-shaped brackets 68. Preferably, each bracket 68 is fastened to its respective plate 49 by means of a pair of screws 69 that pass through oversize holes 70 in said brackets 68 and into cooperating threaded apertures (not shown) in plates 49 whereby the brackets 68 are relatively adjustable in small degree for a purpose that will appear hereinafter.

The upstanding arms of U-shaped members 68 are provided with apertures 99 that function as end retaining means for rods 100, respectively. Supported on each rod 100 is a rib 76 that is fixed to a frame 77. Frames 77 each carry a reflecting mirror 78 in inclined relationship to the path of the light originating from the respective projection system 8 below and directed upwardly through the apertures 50 in plates 49. Ribs 76 are equipped with arms 79 to which are pivotally connected adjusting rods 81. Each rod 81 is provided with a section 82 thereof that has screw threads received in a screw threaded aperture 83 provided in the bottom reach of each U-shaped bracket 68. Elongated slots 80 are provided through which the screw threaded shanks 82 of rods 81 extend in a selected position of plates 49 and U-shaped brackets 68 fixedly mounted thereon. To the ends of the screw threaded shanks 82 and below platform 47 there are provided knurled knobs 84 to permit rotation of shanks 82 and thus selective adjustment of the inclination of mirrors 78.

Fixedly mounted on each plate 49 in upright position is a large cylindrical sleeve 85. In addition notched plate 86 on each plate 49. Extending through each of sleeves 85 and in slidable relationship therewith is a main guiding rod 87, while extending through each of the notched plates 86 is an auxiliary guiding rod 88. These guiding rods 87 and 88 are of sufficient length so that in addition to extending above the respective plate 49 and through their respective sleeves and notched plates 86, they also extend below the platform 47 where they are joined to respective supporting ears 89 of clamping rings 90, each of which is provided with a clamping nut 91 for clampingly retaining a projection lens 92 to be described hereinafter. Extending through plates 49 and ending in a knurled nut 93 that functions as a lower support for each supporting ear 89 is a screw threaded rod 94 that extends upwardly through a cooperating screw threaded aperture 95 in plate 49. As will be readily apparent, rotation of screw threaded rods 94 by means of knurled nut 93, causes lowering or raising of the respective supporting ear 89 and with it, clamping ring 90 and the projection lens 92 retained thereby, all in a guided manner, due to the functioning of the two guiding rods 87 and 88 in their respective sleeves 85 and 86, in conjunction with screw threaded rod 94 in its cooperating screw threaded aperture.

As a most important feature of the instant invention, preferably both projection lenses 92 that may be otherwise conventional, have the optical fields thereof of sufficient size so that when in direct alignment with its respective lower condensing lens 17 and frame 23 it may accommodate a peripheral area outside the dimensions of said condensing lens and frame. It will be apparent that with such arrangement of the parts just referred to, the full image area provided by an image-forming device that may be supported within the dimensions of said frame 23, may be accommodated in entirety by a respective projection lens 92, subsequent to lateral movement of the latter within predetermined limits, for a specific purpose that will appear hereinafter. Thus, the projection lenses 92 may be wide-barrelled, as shown, or may comprise a wide-angle optical component or the like. As is well understood in the optical art, the term "lens," as used in this specification and the appended claims, and the structures as disclosed in the drawings, obviously include those comprising a plurality of optical elements.

The operation of the device described above is as follows:

The respective image forming film, slides, plates and the like that are to be utilized in the formation of the desired composite, superimposed, or selectively separate, projected images, are positioned by means of bars 25 and/or clamps 26 and/or roller means 27—32 as will be obvious to those skilled in the art. Switches 31 are selectively manipulated to energize both or either of lamps 10 as desired, and switch 32 is moved to "on" position whereby blowers 43 are set into operation to prevent overheating of the apparatus by energized lamps 10.

In the matter of optical adjustment, the knurled knobs 93 are manipulated to raise or lower the respective projection lenses 92 so as to obtain the desired focusing of the images on the screen or directly to the lens of a moving picture camera or of a television camera, as desired. Similarly, the knurled nuts 84 are manipulated to alter the inclination of the mirrors 78, respectively, to achieve the desired vertical alignment of the composite, superimposed, or separately projected images. For example, the images from two slides A and B (FIGS. 4 and 5) may be projected on a screen (not shown), and the knurled knobs 84 and 93 adjusted for horizontal alignment and focus until the projected images assume the relationship depicted by A' and B' in FIG. 4 wherein the superimposed portions of images A' and B' are shown by cross-hatching C'. In FIGS. 4 and 5, the directions of the light beams from the image forming devices A and B, respectively, are indicated by broken lines $x$ and $y$, respectively, while the respective optical axes of the two light beam projection, projection lens and mirror systems are indicated by broken lines $z$ and $w$. Brackets 68 with mirrors 78 mounted thereon may be adjusted about the vertical axes to the extent of the large apertures 70 within which the screws 69 are received so as to compensate for any misalignment of the various parts due to manufacturing tolerances therein or for any other reasons. In this manner, the alignment of images A' and B' in the relationship shown in FIG. 4 may be assured by proper adjustment.

Thereafter, knurled knob 65 is rotated in the direction to cause L-shaped members 55 (and plate members 49 therewith together with the respective mountings for projection lenses 92 and mirrors 78, and such optical elements per se), to move toward each other simultaneously. Thereby, because of the large optical fields of projection lenses 92 as described hereinbefore, the entire light beams $x$ and $y$, and with them the optical axes $z$ and $w$, are in effect caused to converge towards each other with the result that the entire respective images A' and B' are ultimately caused to assume the substantially completely coincident positions shown in the diagrammatical representation of FIG. 5. Thus, are the optically sharp composite, superimposed, or selectively separate, images obtained with a device of the present invention.

In the prior art composite image projection devices that utilize inclined mirrors at angles to each other, substantial alignment both vertically and horizontally may be achieved by delicate adjustments of the mirrors. Inherently, however, no matter how the optical components thereof are manipulated, adjustment in one direction tends to throw off adjustment in another direction. Thus, with such devices, even when an optimum result insofar as vertical and horizontal adjustment of the images is obtained there is still a lack of complete rotative alignment as illustrated in FIG. 6, with resultant lack of substantially perfect sharpness achieved by the devices of the present invention.

While a preferred embodiment of the invention has been disclosed and described herein, it will be understood, as referred to hereinbefore, that many modifications of the present invention and variations in the structure of devices for exercising the same are possible and contemplated, within the scope of the appended claim. Thus, certain advantages of the invention may be obtained by maintaining one projection lens and mirror system laterally stationary, while the other is adapted to be moved toward and away from the former to achieve lateral adjustment of the two images. Similarly, only one of the projection lenses may be provided as a movable large barrel lens with large optical field, with the other projection lens of the system provided as one of normal optical field. Merely by way of further examples, the iris shutter 15 and/or the plate shutters 37 may be omitted or other shutter means substituted therefor; e.g., shutter means similar to that shown and described in our aforesaid U.S. Patent No. 2,754,722; light intensity controls for lamps 10 may be included instead of, or in addition to, iris shutters 15; other adjusting and/or mounting means than those shown, may be utilized for the projection lenses 92 and mirrors 78; the device may be utilized to project images other than substantially horizontally; etc.

We claim:

An optical device for projecting superimposed, composite, and selectively separate images, comprising: a first light beam projecting system and a second light beam projecting system, a common support for both said first and said second light beam projecting systems, said first and said second light beam projecting systems being positioned on said common support to project their respective light beams in substantially parallel paths, first means mounted on said common support for supporting an image-forming device in the path of the light beam of said first light beam projecting system, second means mounted on said common support for supporting another image-forming device in the path of the light beam of said second light beam projecting system, a first projection lens, means movably mounting said first projection lens on said common support in spaced relationship with said first image-forming device supporting means and in the path of the light beam of said first light beam projecting system, a second projection lens, means mounting said second projection lens on said common support in spaced relationship with said second image-forming device supporting means and in the path of the light beam of said second light beam projecting system, at least said first projection lens having an optical field that accommodates a substantially greater area than the area of the light beam of said first light beam projecting system, means for moving said first projection lens laterally of the path of said first light beam projecting system, toward said second projection lens to a position off the axis of the path and into a position wherein the complete light beam from said first light beam projecting system may still pass through said first projection lens and be deflected toward the path of the light beam of said second light beam projecting means that passes through said second lens, a first mirror mounted on said common support in the path of the light beam passing through said first projection lens, and inclined to reflect the beam at an angle to the path, said first mirror being mounted on said common support by said means movably mounting said first projection lens on said common support, said first mirror and said first projection lens being movable laterally as a unit, and a second mirror mounted on said common support in the path of the light beam passing through said second projection lens, and inclined to reflect the beam at an angle to the path.

References Cited in the file of this patent

UNITED STATES PATENTS

| | | |
|---|---|---|
| 1,059,969 | Bausch et al. | Apr. 29, 1913 |
| 1,291,954 | Losey | Jan. 21, 1919 |
| 1,738,942 | Brenkert et al. | Dec. 10, 1929 |
| 2,235,743 | Gagliardi | Mar. 18, 1941 |
| 2,693,128 | Dewhurst | Nov. 2, 1954 |
| 2,700,322 | Gruber | Jan. 25, 1955 |
| 2,729,138 | Bernier | Jan. 3, 1956 |
| 2,754,722 | Howell et al. | July 17, 1956 |